(12) United States Patent
Yang et al.

(10) Patent No.: US 9,197,722 B2
(45) Date of Patent: Nov. 24, 2015

(54) HEAT DISSIPATING APPARATUS FOR MOBILE PHONE

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Chih-Hao Yang, New Taipei (TW); Xiang-Kun Zeng, Shenzhen (CN); Bao-Quan Shi, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 222 days.

(21) Appl. No.: 13/931,518

(22) Filed: Jun. 28, 2013

(65) Prior Publication Data

US 2014/0131017 A1   May 15, 2014

(30) Foreign Application Priority Data

Nov. 14, 2012   (CN) .......................... 2012 1 04557528

(51) Int. Cl.
*F03G 1/02*     (2006.01)
*H04M 1/02*     (2006.01)
*F03G 1/08*     (2006.01)
*F04D 29/40*    (2006.01)

(52) U.S. Cl.
CPC .............. *H04M 1/0202* (2013.01); *F03G 1/02* (2013.01); *F03G 1/08* (2013.01); *F04D 29/40* (2013.01)

(58) Field of Classification Search
CPC ....... F04D 25/086; F04D 29/05; F04D 29/40; F04D 29/601; H04M 1/0202; F03G 1/00; F03G 1/02; F03G 1/08
USPC ................... 417/328; 185/37, 39; 361/679.48
See application file for complete search history.

(56) References Cited

U.S. PATENT DOCUMENTS

| | | | | |
|---|---|---|---|---|
| 879,580 | A | * | 2/1908 | Pearsall .......................... 417/328 |
| 924,470 | A | * | 6/1909 | Kelley .............................. 81/7.5 |
| 1,354,916 | A | * | 10/1920 | Pys .................................. 185/37 |
| 1,455,534 | A | * | 5/1923 | Larson ............................. 188/69 |
| 1,659,492 | A | * | 2/1928 | Lee ................................. 416/100 |
| 1,694,168 | A | * | 12/1928 | Dusa ................................. 49/58 |
| 2,376,733 | A | * | 5/1945 | Testin .......................... 415/121.2 |
| 4,561,416 | A | * | 12/1985 | Loechner et al. ........... 126/21 A |
| 6,076,516 | A | * | 6/2000 | Tucker ........................ 126/21 A |

* cited by examiner

*Primary Examiner* — Charles Freay
*Assistant Examiner* — Nathan Zollinger
(74) *Attorney, Agent, or Firm* — Novak Druce Connolly Bove + Quigg LLP

(57) ABSTRACT

A heat dissipating apparatus includes a rear cove, a fan rotatably attached to the rear cover, a slave gear secured to the fan, and a driving gear rotatably attached to the rear cover. The rear cover defines a plurality of air ventilation holes. The fan is aligned with the plurality of air ventilation holes. The driving gear meshes with the driven gear. A resilient member is secured to the driving member. The driving gear is rotatable in a first direction to deform the resilient member. The resilient member is released to rotate the driving gear in a second direction that is opposite to the first direction, and the slave gear and the fan are together rotatable in the second direction by the driving gear.

18 Claims, 7 Drawing Sheets

HEAT DISSIPATING APPARATUS FOR MOBILE PHONE

BACKGROUND

1. Technical Field

The present disclosure relates to heat dissipating apparatuses, more particularly to a heat dissipating apparatus for a mobile phone.

2. Description of Related Art

Mobile phones are popular communication devices. However, heat is continually generated by a plurality of electronic components in the mobile phones, and the mobile phones are often crashed. Therefore, there is room for improvement within the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

Figure 1:
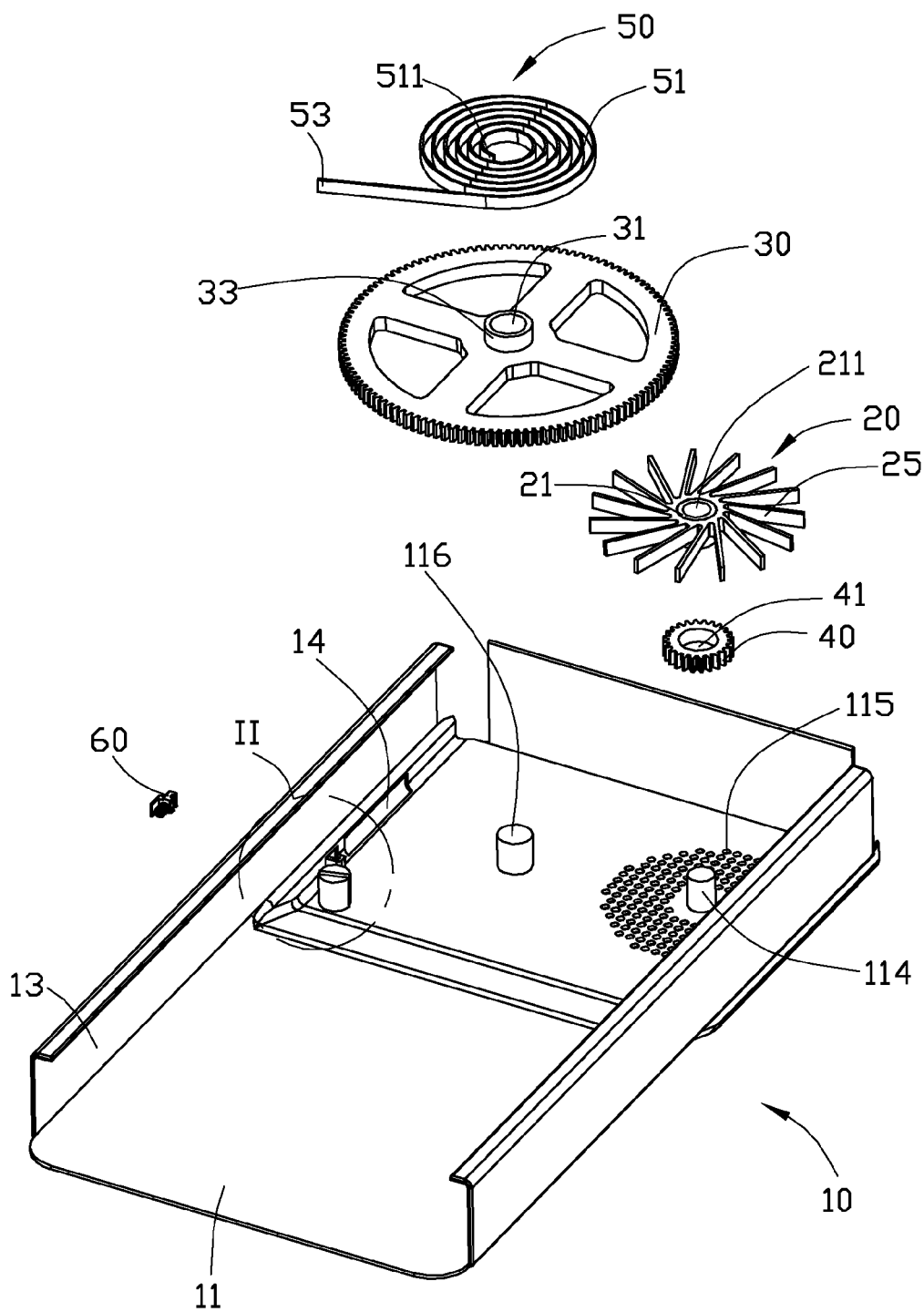
FIG. 1 is an exploded, isometric view of a heat dissipating apparatus with a positioning structure in accordance with an embodiment.
Figure 2:
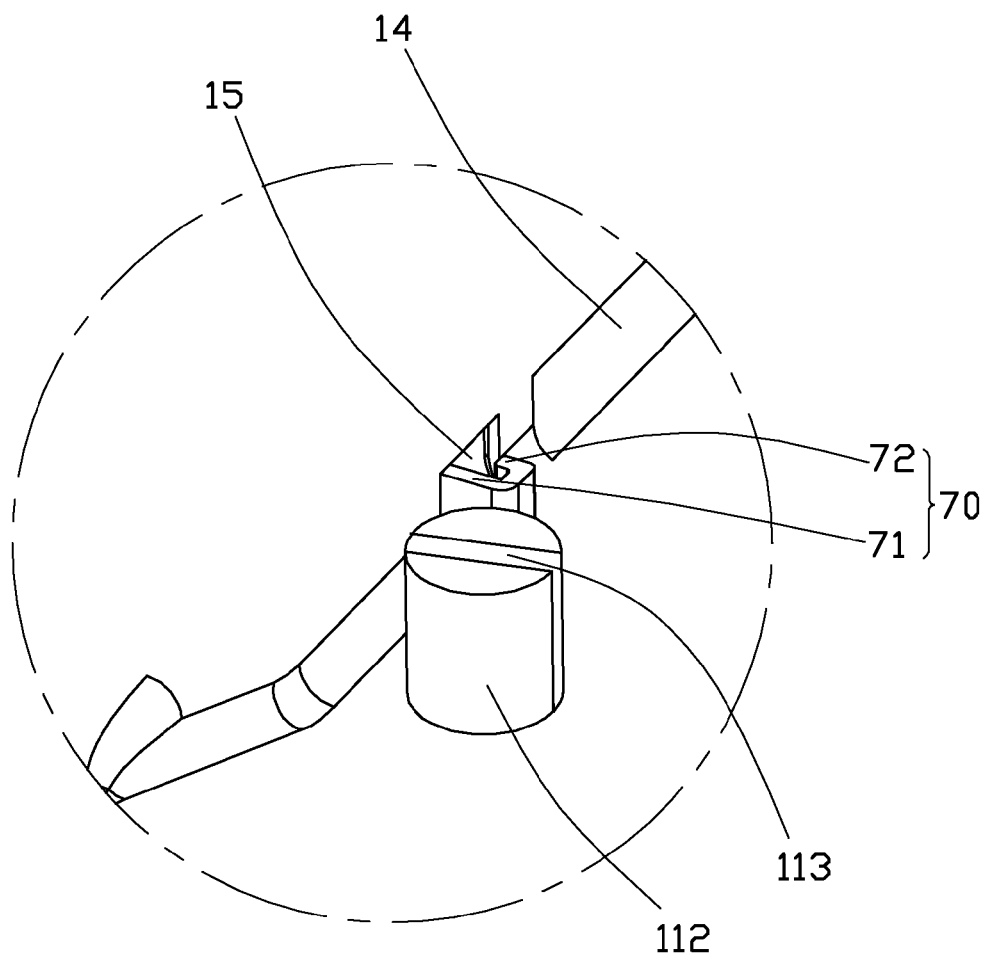
FIG. 2 is an enlarged view of a circled portion II of the heat dissipating apparatus of FIG. 1.
Figure 3:
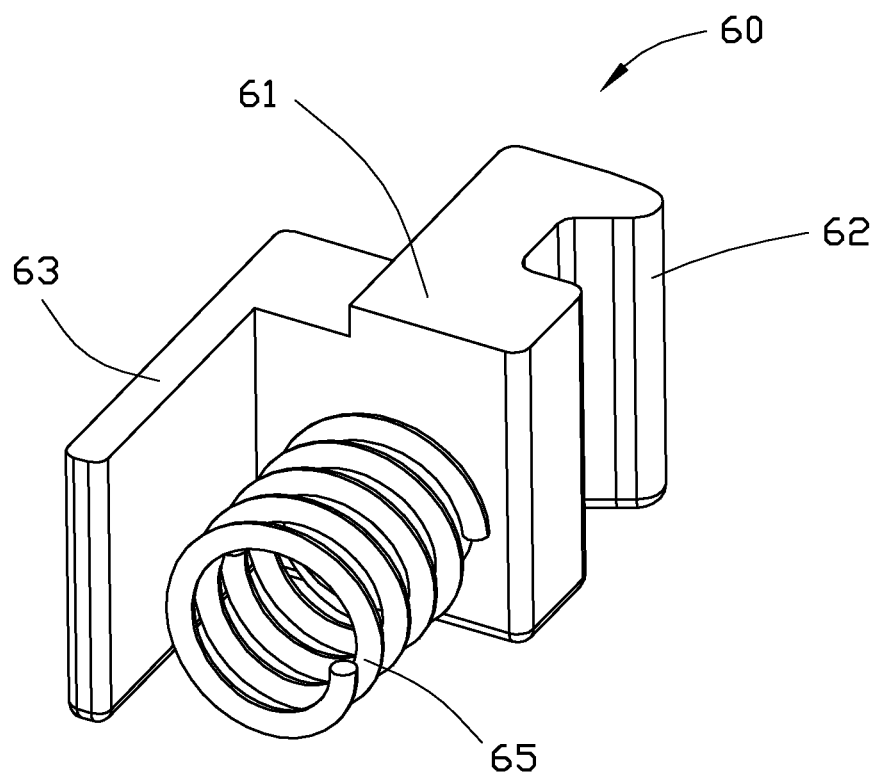
FIG. 3 is an isometric view of a locking member of the heat dissipating apparatus of FIG. 1.
Figure 4:
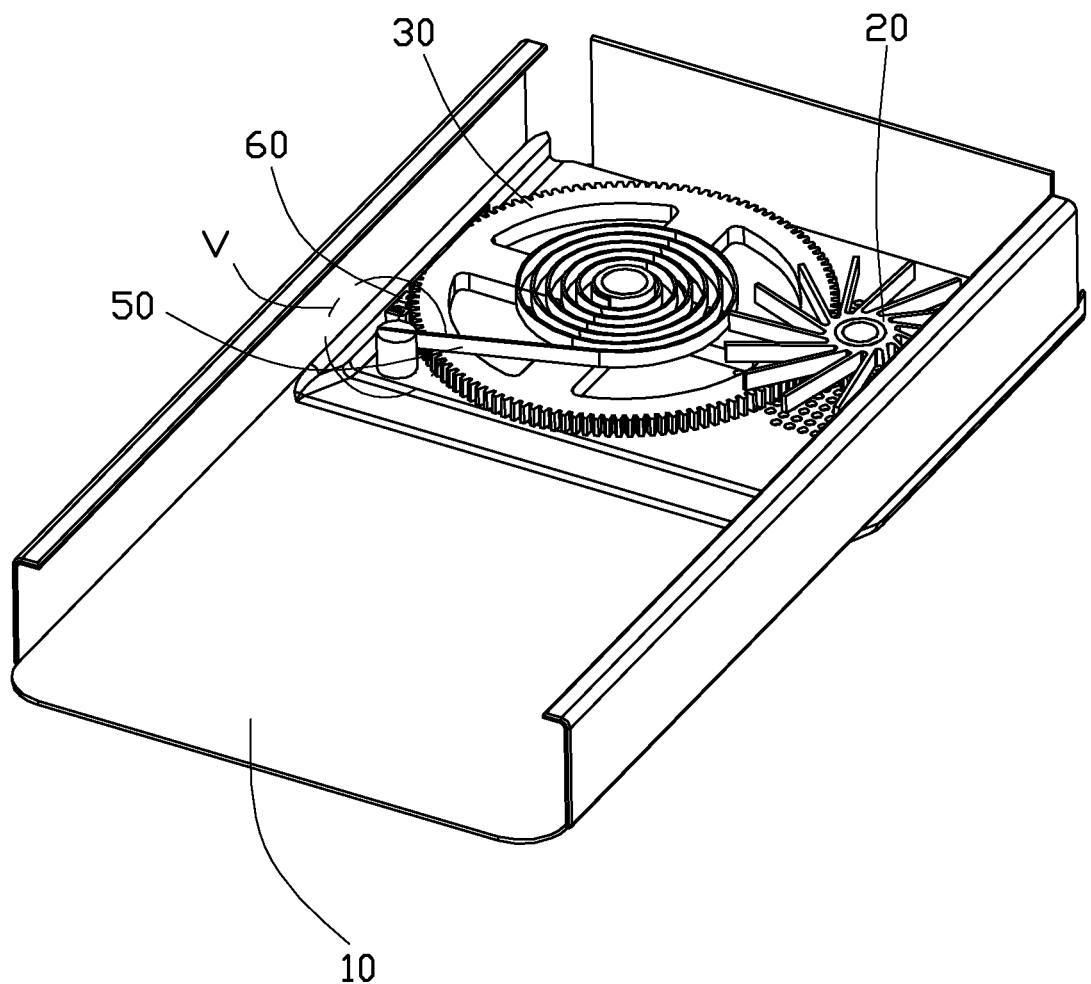
FIG. 4 is an assembled view of the heat dissipating apparatus of FIG. 1.

FIGS. 1-3 illustrate a heat dissipating apparatus in accordance with an embodiment. The heat dissipating apparatus comprises a rear cover 10, a fan 20, a driving gear 30, a slave gear 40, a resilient member 50, and a locking member 60. In one embodiment, the rear cover 10 is a cover of a mobile phone.

The rear cover 10 comprises a bottom panel 11 and a side panel 13 connected to the bottom panel 11. In one embodiment, the side panel 13 is substantially perpendicular to the bottom panel 11. A first opening 14 and a second opening 15 are defined between the bottom panel 11 and the side panel 13. A length of the first opening 14 is greater than a length of the second opening 15. A securing post 112, with a securing slot 113, is located on the bottom panel 11. A clipping member 70 extends from an edge of the second opening 15. The clipping member 70 comprises a resisting piece 71 and a clipping piece 72. The resisting piece 71 is substantially parallel to the clipping piece 72 and perpendicular to the side panel 13 and the bottom panel 11. A plurality of air ventilation holes 115 is defined in the bottom panel 11 and away from the side panel 13. A first rotating shaft 114 and a second rotating shaft 116 are located on the bottom panel 11. In one embodiment, the first rotating shaft 114 and the second rotating shaft 116 are arranged in a straight line that is substantially perpendicular to the side panel 13.

The fan 20 comprises a rotating portion 21 and a plurality of blades 25 around the rotating portion 21. A first rotating hole 211 is defined in the rotating portion 21 and corresponds to the first rotating shaft 114.

The driving gear 30 comprises a plurality of driving gear teeth that can be mesh with the slave gear 40. A mounting portion 33, with a pivoting hole 31, protrudes from the center of the driving gear 30. In one embodiment, the mounting portion 33 is substantially columnar.

The slave gear 40 comprises a plurality of slave gear teeth that can be mesh with the driving gear teeth. A second rotating hole 41 is defined in the slave gear 40. In one embodiment, a diameter of the slave gear 40 is less than a diameter of the driving gear 30.

The resilient member 50 comprises a curve portion 51 and an inserting portion 53. A securing portion 511 is located on a first end of the curve portion 51. The inserting portion 53 extends from a second end of the curve portion 51. In one embodiment, the resilient member 50 is a clockwork spring, and the inserting portion 53 is substantially straight.

The locking member 60 comprises a clasping piece 61, a guiding piece 63 extending from an edge of the clasping piece 61, and a spring 65 secured to the clasping piece 61. In one embodiment, an extending direction of the spring 65 is substantially parallel to the guiding piece 63. A clasping tooth 62 is defined in a top portion of the clasping piece 61.

Figure 5:
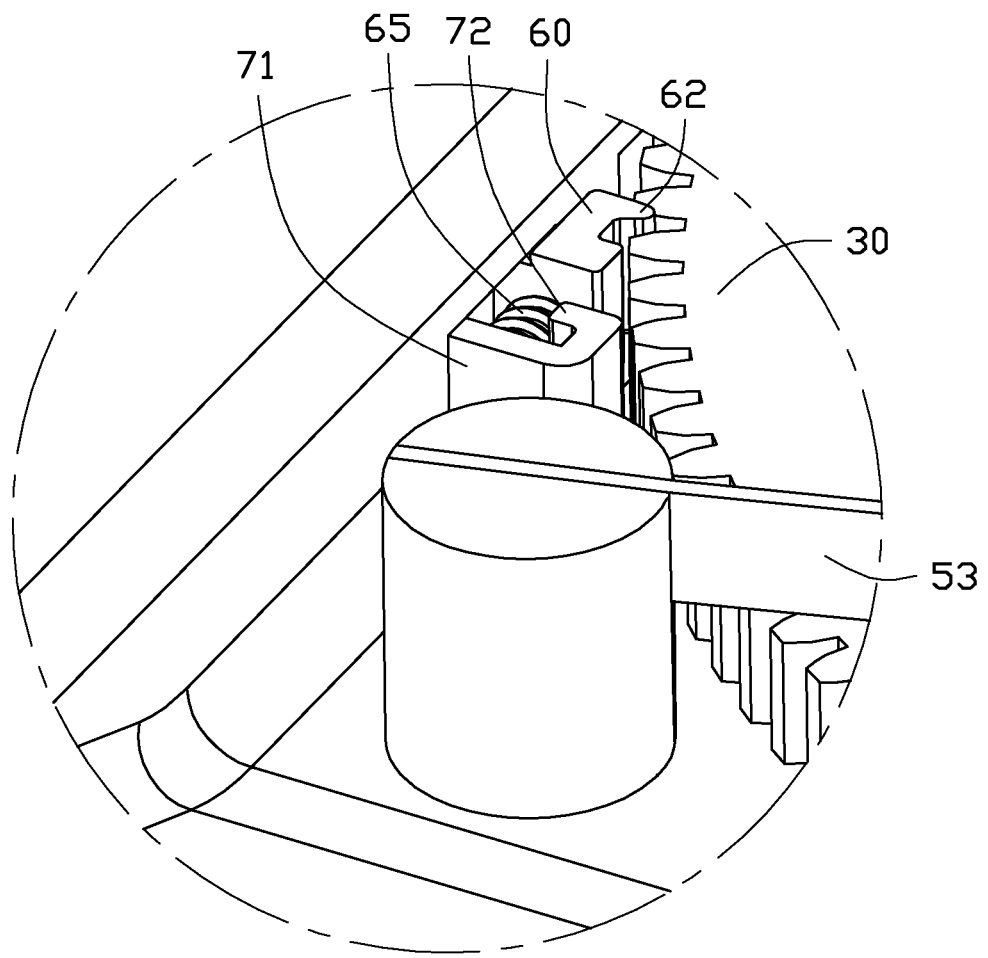
FIG. 5 is an enlarged view of a circled portion V of the heat dissipating apparatus of FIG. 4.
Figure 6:
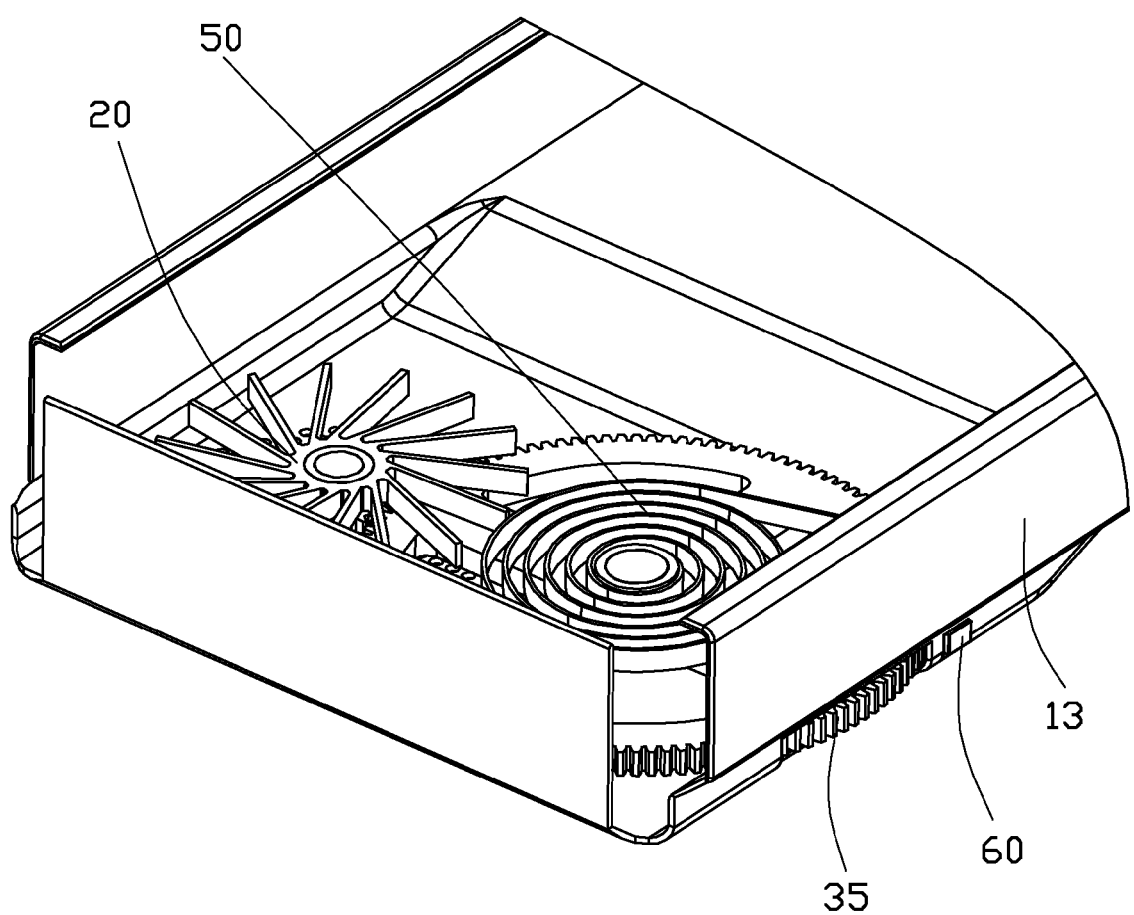
FIG. 6 is similar to FIG. 4, but viewed in a different aspect.
Figure 7:
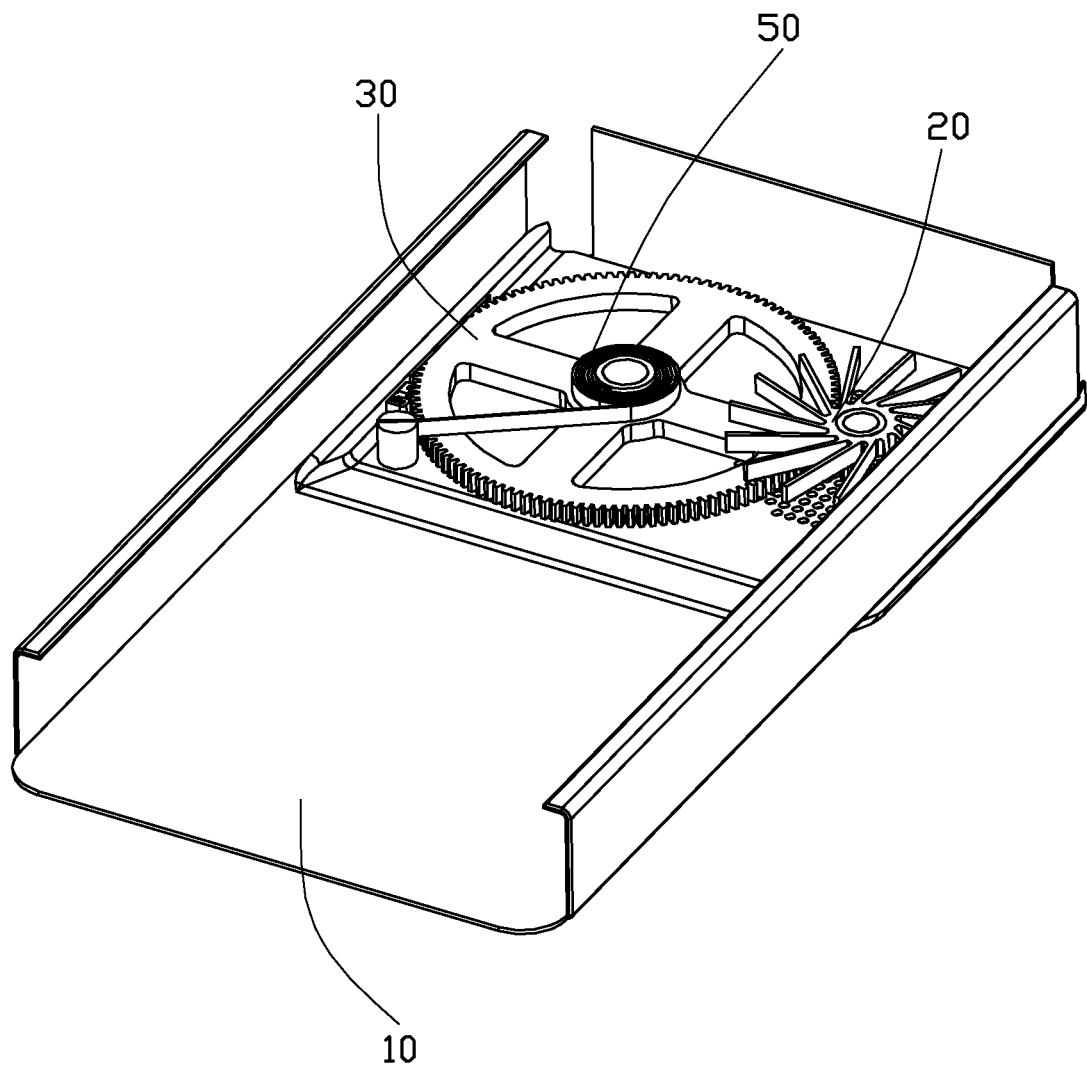
FIG. 7 is similar to FIG. 4, and a resilient member of the heat dissipating apparatus is deformed.

FIGS. 5-7 show that in assembly, the first rotating shaft 114 is engaged into the second rotating hole 41 and the first rotating hole 211, to secure the slave gear 40 to the fan 20. Thus, the fan 20 is rotated when the slave gear 40 is rotated. The second rotating shaft 116 is engaged into the pivoting hole 31, and the driving gear 30 meshes with the slave gear 40. An extending portion 35 (see FIG. 5) extends out of the side panel 13 via the first opening 14. The curve portion 51 surrounds on the mounting portion 33. The securing portion 511 is secured to the mounting portion 33, and the inserting portion 53 is engaged in the securing slot 113.

The guiding piece 63 is located in an interior of the rear cover 10 and extends out of the rear cover 10 via the second opening 15. The spring 65 abuts the resisting piece 71. The clasping tooth 62 meshes with the driving gear 30 in a direction. Thus, the driving gear 30 is rotated in a first direction (for example, a counterclockwise direction) to deform the resilient member 50, and the driving gear 30 is prevented from moving in a second direction that is opposite to the first direction (for example, a clockwise direction) by the clasping tooth 62.

In use, the extending portion 35 is operated to rotate the driving gear 30 in the first direction, and the resilient member 50 is deformed. As the driving gear 30 is prevented from rotating in the second direction by the clasping tooth 62, the resilient member 50 cannot rotate the driving gear 30 in the second direction. When the resilient member 50 is fully deformed, the locking member 60 is moved downwards, the spring 65 is deformed, and the clasping tooth 62 is disengaged from the driving gear 30 and clipped with the clipping piece 72. Thus, the resilient member 50 is released to rotate the driving gear 30 in the second direction, and the slave gear 40 and the fan 20 are together rotated by the driving gear 30, for dissipating the heat generated by the mobile phone.

It is to be understood, however, that even though numerous characteristics and advantages have been set forth in the foregoing description of embodiments, together with details of the structures and functions of the embodiments, the disclosure is illustrative only and changes may be made in detail, especially in the matters of shape, size, and arrangement of parts within the principles of the disclosure to the full extent indicated by the broad general meaning of the terms in which the appended claims are expressed.

What is claimed is:

1. A heat dissipating apparatus comprising:
   a rear cover defining a plurality of air ventilation holes and comprising a side panel; a first opening and a second opening being defined in the side panel;
   a fan rotatably attached to the rear cover and aligned with the plurality of air ventilation holes;
   a slave gear secured to the fan;
   a driving gear rotatably attached to the rear cover and meshing with the slave gear; the driving gear extending through the side panel via the first opening;
   a locking member slidably received in the second opening and comprising a clasping piece, and the clasping piece comprising a clasping tooth engaged with the driving gear; wherein the locking member is slidable relative to the side panel to disengage the clasping tooth from the driving gear; and
   a resilient member secured to the driving gear;
   wherein the driving gear is rotatable in a first direction to deform the resilient member, the resilient member is released to rotate the driving gear in a second direction that is opposite to the first direction, and the slave gear and the fan are together rotatable in the second direction by the driving gear.

2. The heat dissipating apparatus of claim 1, wherein the driving gear comprises a mounting portion, the resilient member comprises a curve portion coiled around the mounting portion, and the curve portion comprises a securing portion that is secured to the mounting portion.

3. The heat dissipating apparatus of claim 2, wherein the rear cover comprises a securing post, the securing post defines a securing slot, and the resilient member comprises an inserting portion engaged in the securing slot.

4. The heat dissipating apparatus of claim 1, wherein the clasping tooth meshes with the driving gear for allowing the driving gear to be rotated in the first direction and prevent the driving gear from being rotated in the second direction.

5. The heat dissipating apparatus of claim 1, wherein a clipping member extends from an edge of the second opening, the clipping member comprises a resisting piece, the locking member comprises a clasping piece and a spring, the clasping tooth is located on the clasping piece, and the spring is located between the clasping piece and the resisting piece.

6. The heat dissipating apparatus of claim 5, wherein the clipping member comprises a clipping piece, and the clipping piece is engaged with the clasping tooth when the clasping tooth is disengaged from the driving gear.

7. The heat dissipating apparatus of claim 6, wherein the clipping piece is substantially parallel to the clasping piece and perpendicular to the side panel.

8. The heat dissipating apparatus of claim 1, wherein the resilient member is a clockwork spring.

9. A heat dissipating apparatus comprising:
   a rear cover defining a plurality of air ventilation holes; a clipping member located on the rear cover and comprising a resisting piece;
   a fan rotatably attached to the rear cover and aligned with the plurality of air ventilation holes;
   a slave gear secured to the fan;
   a driving gear rotatably attached to the rear cover and meshing with the slave gear;
   a resilient member secured to the driving gear; and
   a locking member slidably attached to the rear cover, and the locking member comprising a clasping piece and a spring; the spring being located between the clasping piece and the resisting piece, and the clasping piece comprising a clasping tooth;
   wherein the locking member is slidable relative to the rear cover between a first position and a second position, in the first position, the clasping tooth meshes with the driving gear, and the driving gear is rotatable in a first direction to deform the resilient member, in the second position, the clasping tooth is disengaged from the driving portion, the resilient member is released to rotate the driving gear in a second direction that is opposite to the first direction, and the slave gear and the fan are together rotatable in the second direction by the driving gear.

10. The heat dissipating apparatus of claim 9, wherein the driving gear comprises a mounting portion, the resilient member comprises a curve portion coiled around the mounting portion, and the curve portion comprises a securing portion that is secured to the mounting portion.

11. The heat dissipating apparatus of claim 10, wherein the rear cover comprises a securing post, the securing post defines a securing slot, and the resilient member comprises an inserting portion engaged in the securing slot.

12. The heat dissipating apparatus of claim 10, wherein the rear cover comprise a side panel, a first opening is defined in the side panel, the driving gear extends through the side panel via the first opening.

13. The heat dissipating apparatus of claim 12, wherein the side panel defines a second opening, the locking member is slidably received in the second opening, and the locking member is slidable relative to the side panel to disengage the clasping tooth from the driving gear.

14. The heat dissipating apparatus of claim 13, wherein the clipping member extends from an edge of the second opening.

15. The heat dissipating apparatus of claim 14, wherein the clipping member comprises a clipping piece, and the clipping piece is engaged with the clasping tooth when the clasping tooth is disengaged from the driving gear.

16. The heat dissipating apparatus of claim 15, wherein the clipping piece is substantially parallel to the clasping piece and perpendicular to the side panel.

17. The heat dissipating apparatus of claim 9, wherein the resilient member is a clockwork spring.

18. The heat dissipating apparatus of claim 9, wherein a diameter of the driving gear is greater than a diameter of the driven gear.

* * * * *